United States Patent [19]

Fruchtnicht

[11] 4,140,079
[45] Feb. 20, 1979

[54] WATER CONDITIONING AND CIRCULATION SYSTEM, ESPECIALLY FOR GROWING TANKS OF FISHES

[76] Inventor: Ernst A. Fruchtnicht, Heidesee 28, 2138 Scheessel, Fed. Rep. of Germany

[21] Appl. No.: 761,430

[22] Filed: Jan. 21, 1977

[30] Foreign Application Priority Data

Jan. 26, 1976 [CH] Switzerland .................... 882/76

[51] Int. Cl.² ............................................. A01K 61/00
[52] U.S. Cl. ............................................................. 119/3
[58] Field of Search ............................ 119/2, 3, 4, 5; 210/169; 261/77

[56] References Cited

U.S. PATENT DOCUMENTS

| 3,116,712 | 1/1964 | Ogden et al. | 119/3 |
| 3,870,018 | 3/1975 | Fruchtnicht | 119/3 |
| 4,036,176 | 7/1977 | McCarty et al. | 119/3 |

Primary Examiner—Hugh R. Chamblee
Attorney, Agent, or Firm—Charles Hieken

[57] ABSTRACT

A water conditioning system for fish growing tanks includes several receptacles connected to said tank and to one another in series by risers with cascade-like staggered compressed gas inlets thus obtaining rising water levels from ever one to the next receptacle, the last of which is connected by a return pipe to the growing tank.

10 Claims, 5 Drawing Figures

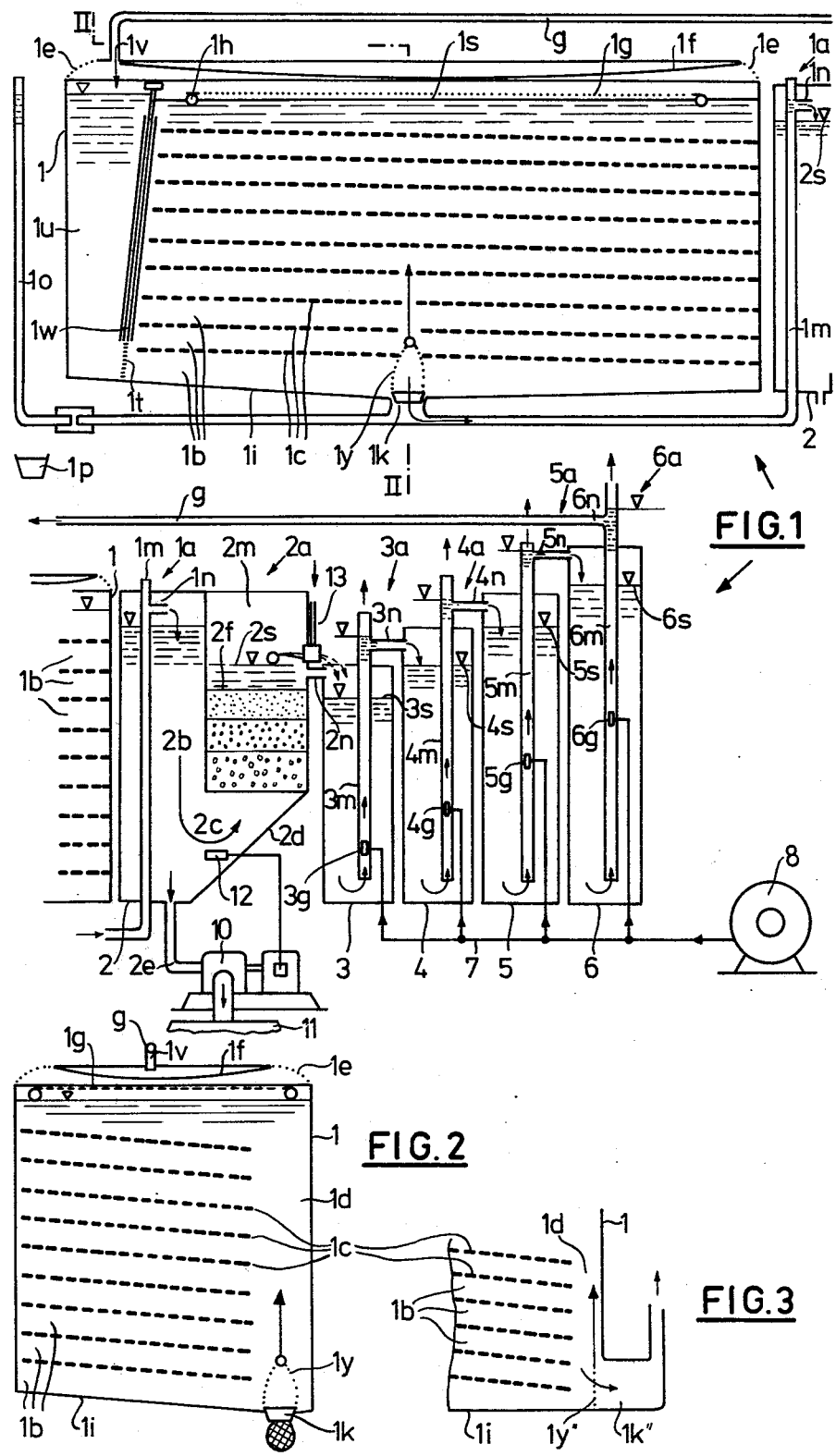

WATER CONDITIONING AND CIRCULATION SYSTEM, ESPECIALLY FOR GROWING TANKS OF FISHES

The invention relates to a water conditioning and circulation system, especially for growing tanks of fishes and crustaceans.

BACKGROUND OF THE INVENTION

The hitherto known water conditioning systems for fish growing tanks are unsatisfying on account of high expenditure of energy and unfavourable proportion of conditioning factors to each other.

PROBLEM

It is an important object of the invention to provide a water conditioning and circulation system which ensures unobjectionable biological conditions and simultaneously economical operation.

SUMMARY OF THE INVENTION

According to the invention said problem has been solved in a simple and efficient manner by providing an aeration means which consists of a cascade of several receptacles having progressively rising water-levels from one to the next collecting-receptacle and transition means consisting of risers provided with compressed-gas inlets which likewise are staggered cascade-like from one to the next riser, the heights of said inlets progressively increasing in correspondence with said progressively rising water levels, the last of which risers is connected to a return pipe delivering the water after its purification and aeration via a heating means to the growing tank. The new aeration device not only enables a high efficient oxigenization but simultaneously maintains a perpetual circulation of water without additional expenditure of energy. Furthermore it enables an improved biological harmonization between the flow-proved velocity through the growing tank and the degree of oxigenization. Thereby it is possible to highly increase the population density of the growing tank. This may preferably be performed by providing a plurality of replaceable floors in said tank, said tank and floors co-acting to define well means for passage of fish to and from said floors the cross sectional area of each floor being several times greater than that of said well means and nevertheless enabling an intensive flooding by using latticed intermediate bottoms defining said floors.

Preferably said heating means consist of modern Reutec-heating elements as are described in DT-PS No. 1.945.988 and DT-AS 2.148.191.

BRIEF DESCRIPTION OF THE DRAWING

FIG. 1 is a vertical section through a silo-like growing tank and water conditioning and circulation system.

FIG. 2 a sectional view of the growing tank along line II—II of FIG. 1,

FIG. 3 a partial sectional view of the growing tank with another construction of the evacuation means, FIG. 4 a second embodiment of the growing tank, and FIG. 5 a top view to FIG. 4 in a smaller scale with the feeding table partially broken away.

Figure 4:
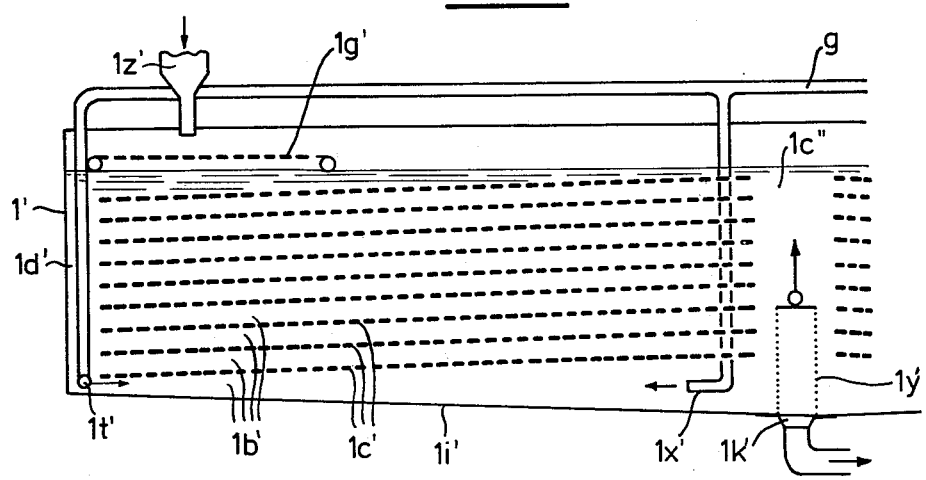

The system shown in the drawing consists essentially of a growing tank 1,1' for bottom fish, crustaceans and the like and a water conditioning and circulation system including a clarifier 2 and means for aeration which oxigenization of the circulating water within a cascade of receptacles 3 to 6 which simultaneously serves to circulate the water by help of a blower 8 and compressed gas pipe 7 through return pipe 9 to the growing tank 1.

The growing tank 1,1' is provided with a plurality of growing floors 1b, 1b' defined by replaceable intermediate latticed bottoms 1c, 1c'. The growing floors are connected by wells 1d, 1d' for passage of fish from and to said floors. The growing tank is provided with a guard net 1e and a light absorbing cover 1f.

A latticed feed table 1g, 1g' is supported by a swimmer 1h in a free distance above the water level 1s. A feeding hopper 1z' is arranged above the feed table.

From the growing tank the water flows through an evacuation hole 1k, 1k' within the bottom 1i, 1i' or a hole 1k'' within a side wall and through a connected riser 1m with overflow 1n to a water conditioning means 2 to 6. Fish, dung, mud and feed-residues can be washed out into a discharge channel 1p through a stand pipe 1o which is sleevable around a horizontal sleeve bearing. The first riser 1m is screened towards the inside of the tank by a removable lattice 1y, 1y', 1y''.

The floors are formed conically sloping or descending towards the adjacent well so that with help of the downwards directed flow of water all floors are automatically cleaned from dung, mud, feed residues and dead fish.

Figure 5:
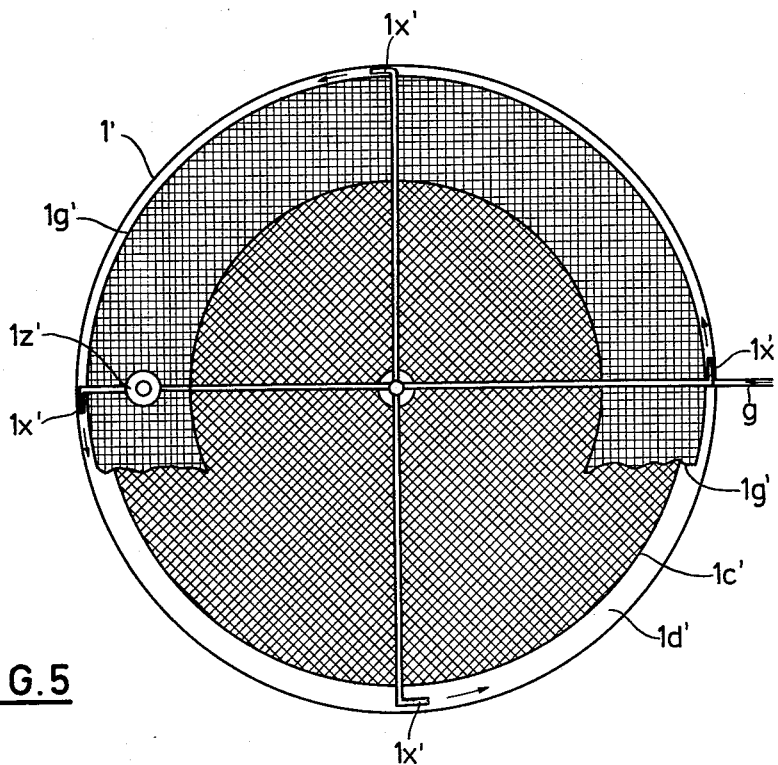

FIGS. 4 and 5 show a growing tank 1' in which circular floors 1c' border on wells 1d' and 1d'' outside and inside.

The wells may just be broad enough to allow an easy fish passage from the floors 1b, 1b' to the feed table 1g, 1g' and vice versa.

The floors are supported by an insert (not shown in the drawing) and the height of the floors is adjustable. Thus, the growing tank may be used alternatively for fish of different sort, namely for fish which moves freely within the space of water with the floors removed or for bottom fish with inserted floors.

The clarifier 2 comprises a U-shaped receptacle including a downcommer 2b connected by a passage 2c to a riser 2m with overflow 2n from 2 to 3. The bottom 2d of the passage 2c slopes to a mud outlet 2e, which is connected to a mud pump 10 controlled by a mud tracer 12 and delivering the mud to a composting device 11.

A fresh water delivering pipe 13 is combined with the overflow 2n of the clarifier.

A filter 2f consisting of coarse, middle and fine gravel is inserted in the riser 2m of clarifier 2.

The water level descends during the first overflow transition 1a from level 1e in the growing tank to level 2s in the clarifier and during the second overflow transition 2a from level 2s to level 3s in the lowermost stage 3 of an aeration cascade 3–6, with its pressure-air-driven overflow-transitions 3a 4a, 5a and 6a, in which stages the water level is raised by help of pressure-air from a pressure-gas pipe 7 inserted through staggered gas-inlets 3g to 6g stepwise from level 3s in receptacle 3 to levels 4s in receptacle 4, level 5s in receptacle 5 and level 6s in the last receptacle 6 of the cascade 3 to 6, from which the conditioned water is transported by the last overflow transition 6a into the return pipe 9.

Before its insertion into the growing tank the conditioned water is delivered through an inlet 1v and is heated to a predetermined temperature within an entrance chamber 1u which is connected to the growing tank itself by a latticed passage 1t near the bottom of the growing tank. The water can also be heated within the return pipe 9 from which it then is inserted into the growing chamber by dipping nozzles 1x', as is shown in FIGS. 4 and 5.

Heating preferably is performed by Reutec-heating elements with heating film and polyurethan screen as are described in DT-PS No. 1.945.988 and DT-AS 2.148.191. For this the partition wall 1w of entrance chamber 1u may consist of a Reutec-hot plate or the return pipe 9 may at least partially consist of a Reutec-hot pipe.

The transition stage 1a from the growing tank 1 to the clarifier could already be utilized for raising the water level by the insertion of compressed-air into the riser 1m.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

| | LIST OF REFERENCES |
|---|---|
| 1,1' | growing tank |
| 1a | overflow transition |
| 1b, 1b' | growing floors |
| 1c, 1c' | floors, intermediate bottoms |
| 1d, 1d', 1d" | connecting well |
| 1e | guard net |
| 1f | cover |
| 1g, 1g' | feed table |
| 1h | annular swimmer of 1g, 1g' |
| 1i, 1i' | bottom of 1,1' |
| 1k, 1k', 1k" | evacuation hole |
| 1m | riser of 1a |
| 1n | overflow of 1m |
| 1o | tilting pipe |
| 1p | discharge channel |
| 1s | water level in 1 |
| 1t | passage for heated water |
| 1u | heated entrance chamber |
| 1v | inlet of 1u |
| 1w | partition wall |
| 1x' | dipping nozzles in 1' |
| 1y, 1y', 1y" | lattice |
| 1z' | (feeding) filler |
| 2-6 | water conditioning means |
| 2 | clarifier |
| 2a | riser from 2 to 3 |
| 2b | downcommer |
| 2c | connecting part, passage from 2b to 2m |
| 2d | bottom of 2 |
| 2e | mud outlet |
| 2f | filter in 2 |
| 2m | riser of 2a, second leg of 2a |
| 2n | overflow of 2m |
| 2s | water level in 2 |
| 3-6 | cascade, cascade steps |
| 3 | collecting receptacle, first lowermost cascade step |
| 3a | riser from 3 to 4 |
| 3g | gas inlet of 3a |
| 3m | riser in 3a |
| 3n | overflow of 3m |
| 3s | water level in 3 |
| 4 | collecting receptacle, second cascade step |
| 4a | riser from 4 to 5 |
| 4g | riser in 4 |
| 4n | overflow of 4m |
| 4s | water level in 4 |
| 5 | collecting receptacle, third cascade step |
| 5a | riser from 5 to 6 |
| 5g | gas inlet of 5a |
| 5n | overflow of 5m |
| 5m | riser in 5 |
| 5s | water level in 5 |
| 6 | collecting receptacle, last cascade step |
| 6a | riser from 6 to 1 |
| 6g | gas inlet of 6a |
| 6m | riser in 6 |
| 6n | overflow of 6m |
| 6s | water level in 6 |
| 7 | compressed-gas pipe |

| | LIST OF REFERENCES -continued |
|---|---|
| 8 | blower |
| 9 | return pipe from 6 to 1 |
| 10 | mud pump |
| 11 | composting device |
| 12 | tracer |
| 13 | fresh-water inlet |

I claim:

1. A fish growing equipment with water conditioning and circulation system, especially for growing tanks of fishes and crustaceans comprising, means defining a growing tank with nominal water level and formed with an evacuation hole at the bottom, means defining a clarifier beside said growing tank having an inlet and an outlet for filtering water passing therethrough from the clarifier inlet to the clarifier outlet, an evacuation conduit connected between said evacuation hole and said clarifier inlet for carrying water from the growing tank to the clarifier, aeration means including a cascade of several receptacles beside said clarifier having progressively rising water levels in each receptacle and transition means for intercoupling said receptacles including side-by-side risers each provided with a compressed-gas inlet for delivering compressed air to the associated riser, the heights of said compressed-gas inlets progressively increasing in correspondence with said progressively rising water levels, the last of said rising water levels being higher than said nominal water level, the first receptacle of said cascade being connected to said clarifier outlet, and a return conduit connected between the last of said receptacles and said growing tank for delivering conditioned water to said growing tank.

2. System in accordance with claim 1, wherein said growing tank comprises a plurality of replaceable floors in said tank, said tank and floors coacting to define well means for passage of fish to and from said floors and cross sectional area of each floor being several times greater than that of said well means and nevertheless enabling an intensive flooding by using latticed intermediate bottoms defining said floors.

3. System in accordance with claim 1 wherein said compressed-gas inlets are connected to a common compressed-gas pipe.

4. System in accordance with claim 1 wherein said clarifier includes a mud outlet.

5. System in accordance with claim 1, and futher comprising a composting device connected to a mud outlet of the system.

6. System in accordance with claim 1, and further comprising a fresh water conduit connected to the first of said receptacles for receiving fresh water.

7. System in accordance with claim 1 wherein said clarifier comprises a downcommer connected by a passage to a riser.

8. System in accordance with claim 1, and further comprising heating means between said cascade and said growing tank.

9. System in accordance with claim 8, and further comprising a heated entrance chamber within the growing tank, the partition wall of which comprises a reutec-hot plate.

10. System in accordance with claim 8 wherein the return conduit comprises at least partially of a reutec-hot pipe.

* * * * *